US006804395B1

(12) United States Patent
Yoshida

(10) Patent No.: US 6,804,395 B1
(45) Date of Patent: Oct. 12, 2004

(54) IMAGE SEPARATING APPARATUS WITH BLACK ISOLATION POINT REMOVAL OF A CHARACTER AREA

(75) Inventor: Tomoyuki Yoshida, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 574 days.

(21) Appl. No.: 09/587,273

(22) Filed: Jun. 5, 2000

(30) Foreign Application Priority Data

Jun. 4, 1999 (JP) .......................................... 11-158573

(51) Int. Cl.[7] .............................. G06K 9/34; G06K 9/40; H04N 1/409

(52) U.S. Cl. ...................... 382/176; 382/275; 358/1.11; 358/2.1; 358/453; 358/462; 358/463; 358/464

(58) Field of Search .............................. 382/164, 173, 382/176, 177, 205, 275, 261; 358/1.11, 1.18, 2.1, 462, 463, 464, 453

(56) References Cited

U.S. PATENT DOCUMENTS

| 5,331,442 | A | * | 7/1994 | Sorimachi ................... 358/532 |
| 5,590,224 | A | * | 12/1996 | Fast et al. ................... 382/291 |
| 5,764,812 | A | * | 6/1998 | Sakano ....................... 382/261 |
| 5,848,185 | A | * | 12/1998 | Koga et al. ................. 382/173 |
| 5,956,468 | A | * | 9/1999 | Ancin ......................... 358/1.9 |
| 6,356,657 | B1 | * | 3/2002 | Takaoka et al. ............ 382/197 |
| 6,400,845 | B1 | * | 6/2002 | Volino ......................... 382/176 |
| 6,438,265 | B1 | * | 8/2002 | Heilper et al. .............. 382/172 |
| 6,473,202 | B1 | * | 10/2002 | Kanata et al. ............... 358/2.1 |
| 2001/0021035 | A1 | * | 9/2001 | Takashimizu ............... 358/1.9 |

OTHER PUBLICATIONS

Machine Translation of Japanese Publication 05–056287 and abstract, Mar. 5, 1993.*
M.B.H. Ali, Background noise detection and cleaning in document images, Proceedings of the 13th International Conference on Pattern Recognition, Aug. 25–29, 1996, vol. 3, p 758–762.*
Yan et al, Noise and background removal from handwriting images, Proceedings of the Intelligent Information Systems, Dec. 8–10, 1997, p 366–370.*

* cited by examiner

Primary Examiner—Bhavesh M. Mehta
Assistant Examiner—Christopher Sukhaphadhana
(74) Attorney, Agent, or Firm—Oblon, Spivak, McClelland, Maier & Neustadt, P.C.

(57) ABSTRACT

A digital image processing apparatus capable of high-quality reproduction in which a black isolation point does not lie scattered even for a manuscript document having a colored background. The digital image processing apparatus separates the image data from the document image into a character area and a picture area, and includes a character candidate area detecting circuit, a background area detecting circuit, an area judging circuit for judging an area satisfying at the same time the conditions of the character candidate area detecting circuit and the background area detecting circuit to be the character area and judging the area outside the character area to be the picture area, a character processing section for processing the image data in the character area, a picture processing section for processing the image data in the picture area, and an area process selecting section for selecting either one of the character processing section and the picture processing section on the basis of a judgment result of the area judging circuit.

9 Claims, 16 Drawing Sheets

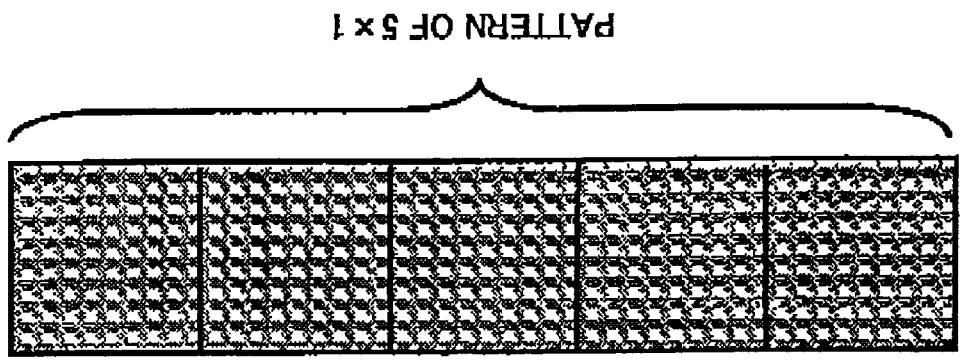
Fig. 9B  PATTERN OF 5 × 1
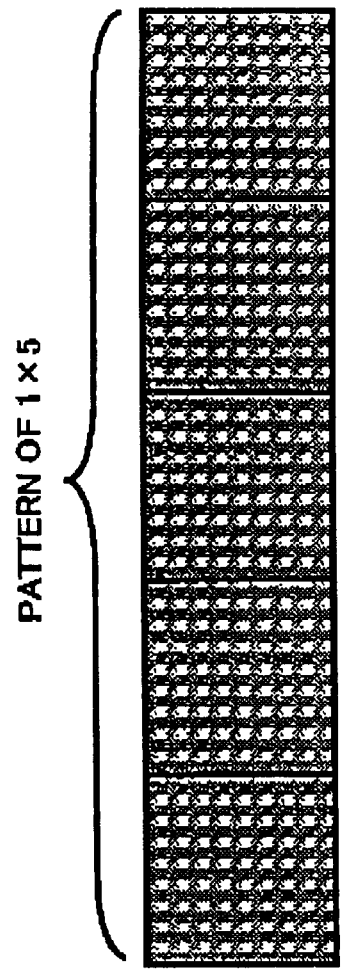
Fig. 9A  PATTERN OF 1 × 5

X : NOTICEABLE PIXEL

IMAGE SEPARATING APPARATUS WITH BLACK ISOLATION POINT REMOVAL OF A CHARACTER AREA

CROSS-REFERENCE TO RELATED APPLICATIONS

This application claims benefit of priority under 35 U.S.C. 120 to Japanese Patent Application No. 11-158573 filed in the Japanese Patent Office on Jun. 4, 1999, the entire contents of which are incorporated by reference herein.

BACKGROUND OF THE INVENTION

1. Field of the Invention

The present invention relates to a digital image processing apparatus capable of precisely taking in the image of an original manuscript document having a color background (including or excluding black).

2. Discussion of the Background

Recently, office automation has widely spread throughout the country and all over the world, so that the number of the documents handled in the office has been increasing year by year (day by day). In order effectively to manage those documents, there has been frequently utilized an electronic filing system capable of memorizing the image data obtained by binarily processing the contents of the documents, i.e., the image or information written on the recording paper, by use of an image scanner to produce electronic image data to be stored in the electronic filing system.

In such a filing system, the image scanner frequently employs separation technology to simplify handling of original manuscript documents in which a character area and a picture area exist mixedly and to improve the image quality upon the reproducing the image of the original manuscript document.

Furthermore, as one method of precisely separating an image area into a character area and a picture area using a small amount of hardware, the contents of Japanese Laid-open Patent Publication No. 4-248766 are well known. In the specification thereof, there is disclosed an AND circuit taking a logic AND of the character candidate area detected by a character candidate area detecting circuit and the white background candidate area detected by a white background area detecting circuit. The area judged to be the character candidate area and to be the white background candidate area is considered to be the character area. After practicing the MTF compensation of the above character area, the selection of processing is performed with the priority of the resolution obtained by binarizing with a fixed threshold value. Furthermore, the area outside the area judged to be the above-mentioned character area is considered to be the picture area. In such a method, the selection of processing has been performed with the priority of the halftone obtained by binarizing by use of the dither method or the error diffusion method, and thereby the resolution precessing for the character area and the halftone processing for the picture area could be performed at the same time.

However, the original manuscript document employed in the electronic filing has been paper based not only on a white-background recording paper but also often on a colored-background recording paper such as an article of a newspaper and a magazine, a catalog or brochure, etc. In such situation, according to the above-mentioned binarizing process, since binarizing using a fixed threshold value with the priority of the resolution is practiced only on the circumferential portion of the character contour, the binarizing process is practiced as the picture area by way of the dither method or the error diffusion on the background area. Since the original manuscript document on the colored background is reproduced in the state of the imaginary halftone, the black isolation point lies scattered, and thereby a phenomenon just like a particle-state dirt on the background may apparently happen. Consequently, the reproducing quality of the manuscription document is considerably deteriorated.

Heretofore, the background art regarding the digital image processing apparatus has been described. However, according to such background art, e.g., Japanese Laid-open Patent Publication No. 4-248766, there exists no advantageous functional effect for improving the digital image processing apparatus.

SUMMARY OF THE INVENTION

The present invention has been made in view of the above-mentioned problems and other problems in order to solve the above-mentioned defects and troublesome matters of the background arts.

To that end, the present invention provides a high-quality digital image processing apparatus in which the background area in the vicinity of the image area to be treated with the separation processing by use of a image area separation processing mechanism is detected by the background area detecting mechanism, a black isolation point is removed only in the image data existing in the detected background area, such that the black isolation point does not lie scattered at all even on the colored background of the manuscript document.

In a first embodiment of the present invention, a digital image processing apparatus having a function of separating the image data from the original manuscript document into a character area and a picture area is composed of a character candidate area detecting mechanism configured to detect the character candidate area from the image data, a background area detecting mechanism configured to detect the background area in the vicinity of the area to be detected, an area judging mechanism configured to judge that an area satisfying at the same time the conditions of the character candidate area detecting mechanism and the background area detecting mechanism is the character area and the area outside the character area in the picture area, a character processing mechanism configured to process the image data in the character area, a picture processing mechanism configured to process the image data in the picture area, and an area-processing selecting mechanism configured to select either one of the character processing mechanism and the picture processing mechanism on the basis of the judgement result of the area judging mechanism.

In such structure of the digital image processing apparatus as mentioned above, the separation of the image on the original manuscript document having a background density of some extent can be precisely performed.

In a second embodiment of the present invention relating to the first embodiment, the digital image processing apparatus further includes a black isolation point removing mechanism configured to remove the black isolation point only in the image data existing in the background area detected by the background area detecting mechanism among the image data from the processing mechanism selected by the area-processing selecting mechanism.

In such structure of the digital image processing apparatus as mentioned above, the process with the priority of the halftone is practiced in the background area, and the occurrence of the particle-state isolation point is removed. Consequently, the quality of reproducing the original manuscript document can be considerably improved.

In a third embodiment of the present invention relating to the second embodiment, the digital image processing apparatus further includes a black isolation point changing-over mechanism configured to change over the size of the black isolation point removed by the black isolation point removing mechanism. The black isolation point changing-over mechanism changes over the size of the black isolation point removed in accordance with the density of the image data from the original manuscript document.

In such structure of the digital image processing apparatus as mentioned above, the size of the black isolation point to be removed can be changed over in accordance with the contents of the manuscript document image, and thereby the black isolation point of the manuscript document having the background density can be effectively removed. In addition, since the black isolation point removed in accordance with the density of the image data from the manuscript document image can be performed, the quality of reproducing the original manuscript document can be further improved, compared with the case of the second embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A and 9B are pattern diagrams employed for the judgment of the background pixel mass in a background pixel mass pattern matching circuit of the digital image processing apparatus according to the present invention;

DETAILED DESCRIPTION OF THE PREFERRED EMBODIMENTS

Figure 1:
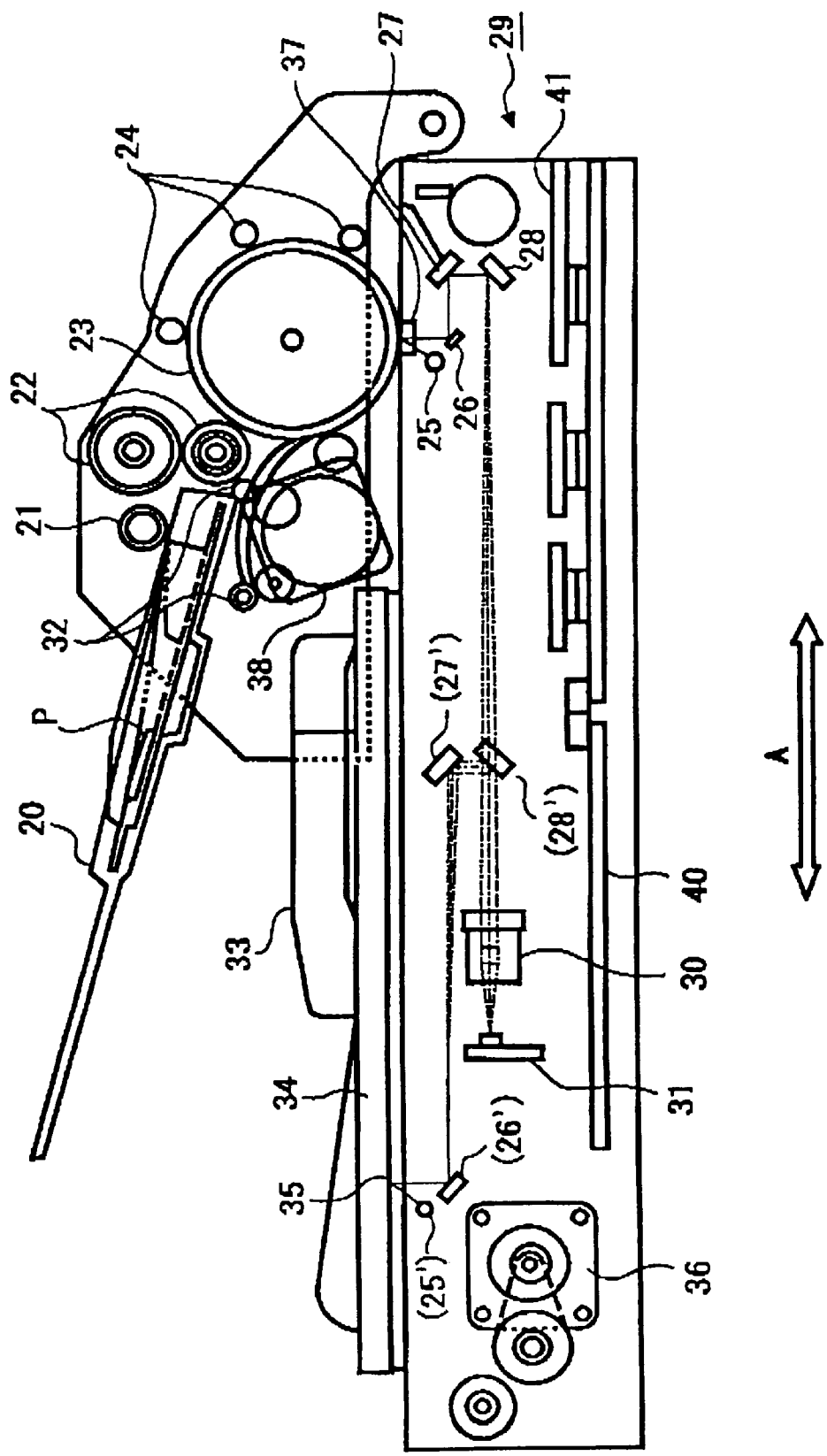
FIG. 1 is a side view illustrating the main part of an image reading-out apparatus according to the present invention.

Referring now to the drawings, wherein like reference numerals designate identical or corresponding parts throughout the several views, there is illustrated first, second and third embodiments of the digital image processing apparatus of the present invention.

FIRST EMBODIMENT

The first embodiment according to the present invention is described hereinafter in detail, referring to FIGS. 1 through 16.

FIG. 1 is an internal perspective side view illustrating the main part of an image reading-out apparatus. The image reading-out apparatus is composed of a scanner device for reading out the manuscript image and converting the read-out image to the image data and a digital image processing apparatus for processing the image data from the original manuscript document image. Since the detailed function and structure of the general image reading-out apparatus have been already well known, the description thereof is omitted here. Only the overall outline of the digital image processing apparatus is described.

In FIG. 1, the original manuscript document P put on a document tray 20 is sent out by a pickup roller 21 and a pair of registration rollers 22 and further conveyed by a conveying drum 23 and conveying rollers group 24 at a constant speed. Furthermore, half way of conveying the manuscript document, a static illumination lamp 25 and on optical unit 29 composed of a first mirror 26, a second mirror 27, and a third mirror 28 read out the image on the manuscript document.

Namely, the light from the illumination lamp 25 is radiated onto the document image. The light reflected on the surface of the document is guided to a light focusing lens 30 via the first mirror 26, the second mirror 27, and the third mirror 28, and the focused light is radiated onto an optoelectric conversion element 31, such as a CCD, etc., and optoelectric conversion is performed in accordance with the light intensity corresponding to the reflected light from the manuscript document. The electric signal thus converted is guided via connection wires (not shown) to a printed circuit board 40 including various image processing circuits, where image processing is performed, and the processed image is transmitted to an external apparatus, as occasion demands, through an external connecting section 41. Furthermore, the read-out manuscript document is further conveyed by a pair of paper discharging rollers 32 and collected in a paper discharging tray 33. The conveying drum 23, the conveying rollers pair 24, the paper discharging rollers pair 32, etc. are driven by a conveying motor 38.

On the other hand, upon opening the document stand cover 34, the image on the manuscript document put on a contact glass 35 is read out by the optical unit 29 moving with constant speed from the right side. Namely, as shown io FIG. 1, the light emitted from the illumination lamp 25' is radiated onto the document P put on the contact glass 35. The light reflected thereon is deflected by the first mirror 26', the second mirror 27', and the third mirror 28'. The deflected light is guided to the focusing lens 30 and radiated onto the optoelectric conversion element 31 and thereby the optoelectric conversion is performed. The signal processing after the optoelectric conversion is same as the above-mentioned. The optical unit 29 can be moved in the direction indicated by the arrow A by the moving object motor 36 serving as a driving source. Furthermore, the rotative drive from the conveying motor 36 is transmitted to the above-mentioned various conveying rollers by use of the pulley or belt not shown.

Furthermore, a standard plate 37 is provided for the purpose of compensating the unevenness of the light intensity of the illumination lamp 25 itself and the unevenness of the light intensity due to temperature variation and time elapsing variation and further compensating the unevenness of the light intensity due to the positional difference of the illumination lamp 25 and the optoelectric conversion element 31, such as a CCD, etc. in the main scanning direction (in the direction perpendicular to the paper FIG. 1 from the front side to the rear side of the paper). Namely, before reading out the image on the document P, the image on the standard plate 37 is read out, and then shading compensation is practiced for the document reading-out data by use of the reading-out data of the standard plate 37. Generally, in implementing the standard plate 37, the method of handling a standard gray plate is the same as that of handling the standard white plate.

Furthermore, the reading-out density conversion in the main scanning direction for the manuscript document is performed by way of electric magnification/reduction. Since the iris of the focusing lens 30 and the number of pixels of the CCD 31 are both fixed, the reading-out density in the main scanning direction also becomes a constant value. Here, the apparatus is constructed such that the reading-out density in the main scanning direction becomes 400 dpi. In such construction, the read-out image data of 400 dpi are interpolated by use of an electric circuit having a line memory (not shown), and then the intermittent process and the double writing are performed at the same time. Thereby, density conversion of optional dpi can be done. For instance, in order to reduce the readout density of 400 dpi in the main scanning direction to the density of 200 dpi, the adjacent two pixels are interpolated and converted to one pixel processed with the intermittent treatment. Furthermore, in order to enlarge the read-out density of 400 dpi in the main scanning direction to the density of 800 dpi, the single pixel is processed by means of interpolation and double writing at the same time. In such way, a single pixel can be converted to the two pixels.

On the other hand, the reading-out density conversion in the subscanning direction for the manuscript document is performed by mechanical magnification/reduction. Generally, as the moving object motor 36 and the conveying motor 38, a stepping motor is used for the purpose of simplifying the control. Furthermore, the driving speed of these motors is changed and thereby the reading-out speed for the document in the subscanning direction is change. As the result, the reading-out density is also changed. In such way, density conversion can be done. For instance, in order to perform the reading-out operation with 200 dpi for the scanning speed ($\lambda$) with dpi, the motor is driven 50 as to scan with the scanning speed ($2\times\lambda$). On the other hand, in order to perform the reading-out operation with 800 dpi, the motor is driven so as to scan with the scanning speed ($\lambda/2$).

Figure 2:
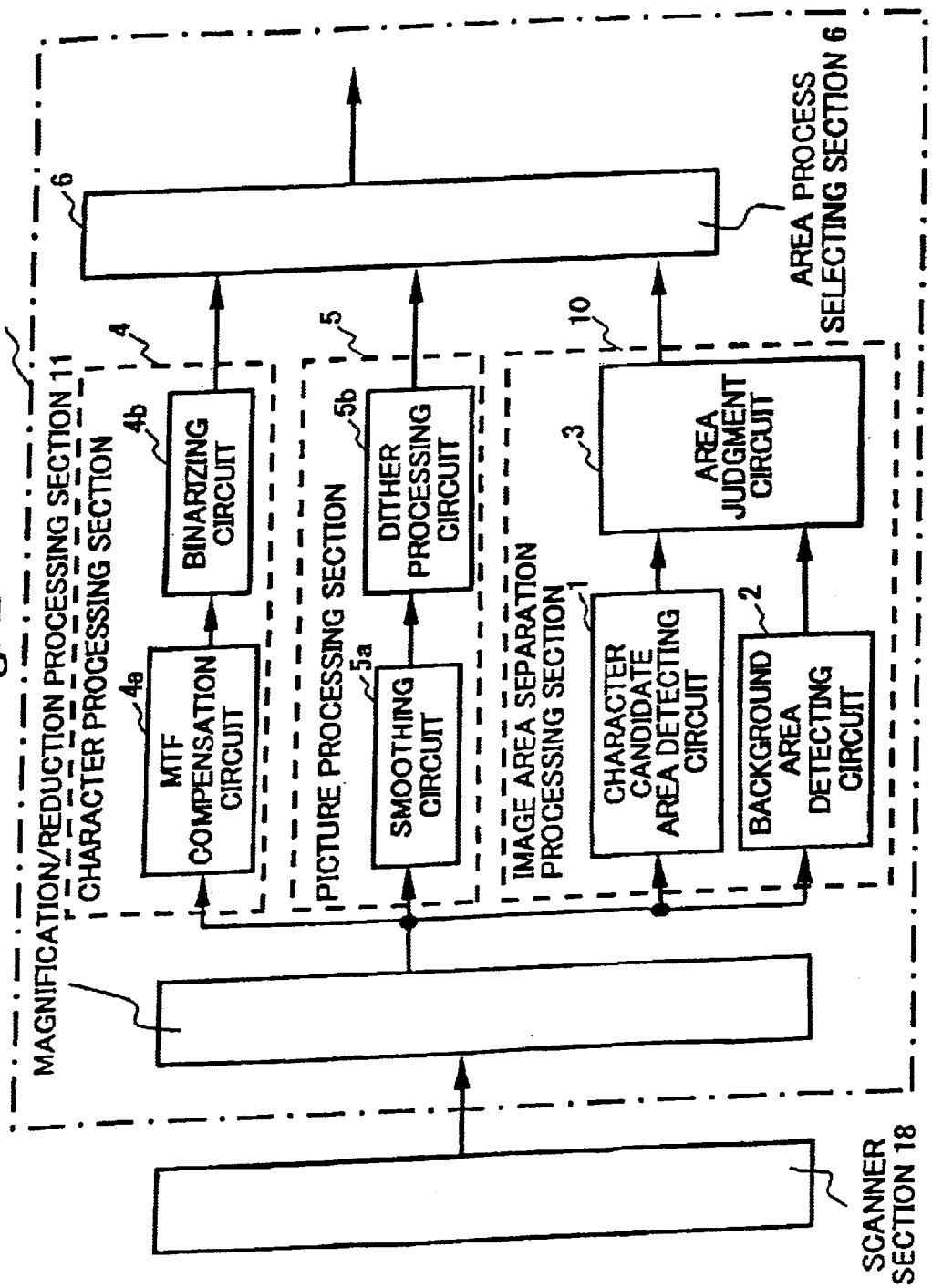
FIG. 2 is a block diagram explaining, by example, the main part of a digital image processing apparatus according to the present invention.

FIG. 2 is a block diagram illustrating the main part of the digital image processing apparatus relating to the first embodiment according to the present invention. In FIG. 2, a scanner section 18 optically reads out the image on the original manuscript document, and the light reflected thereon is guided to the optoelectric conversion element 31. At this time, the image data corresponding to the image can be obtained, for instance, as an 8 bit digital signal.

The image data from the document image obtained by the scanner section 18 is firstly guided to a magnification/reduction section 11 in a digital image processing apparatus 19, and the aforementioned magnification/reduction treatment in the main scanning direction is practiced by the section 11. The image data thus treated are respectively inputted to a character processing section 4, a picture processing section 5, and an image separation processing section 10.

The character processing section 4 is constructed with an MTF compensation circuit 4a and a binarizing circuit 4b, having a fixed threshold value etc., in order to process the image with the priority for the resolution, On the other hand, the picture processing section 5 is constructed with smoothing circuit 5a and a dither processing circuit 4b, etc., in order to process the image with the priority for the halftone. The image area separation processing section 10 is constructed with a character candidate area detecting circuit 1 serving as a character candidate area detecting mechanism for detecting the character candidate area from the image data, a background area detecting circuit 2 serving as a background area detecting mechanism for detecting the background area in the vicinity of the detected area, and an area judging circuit 3 serving as an area judging mechanism.

The area judging circuit 3 judges that the area satisfying, at the same time, the condition of the character candidate area detecting circuit 1 and that of the background area detecting circuit 2 is the character area, and further judges that the area excluding the character area is the picture area. Namely, when the area is judged to be the character candidate area and the background area exists in the vicinity thereof, the area judging circuit 3 judges the area as the character area and outputs the character area judging signal to an area process selecting section 6 of the next stage serving as the area process selecting mechanism. As the result, the area process selecting section 6 selects either one of the processing circuits in the character processing section 4 and the picture processing section 5, in accordance with the judgment result of the area judging circuit 3.

Figure 5:
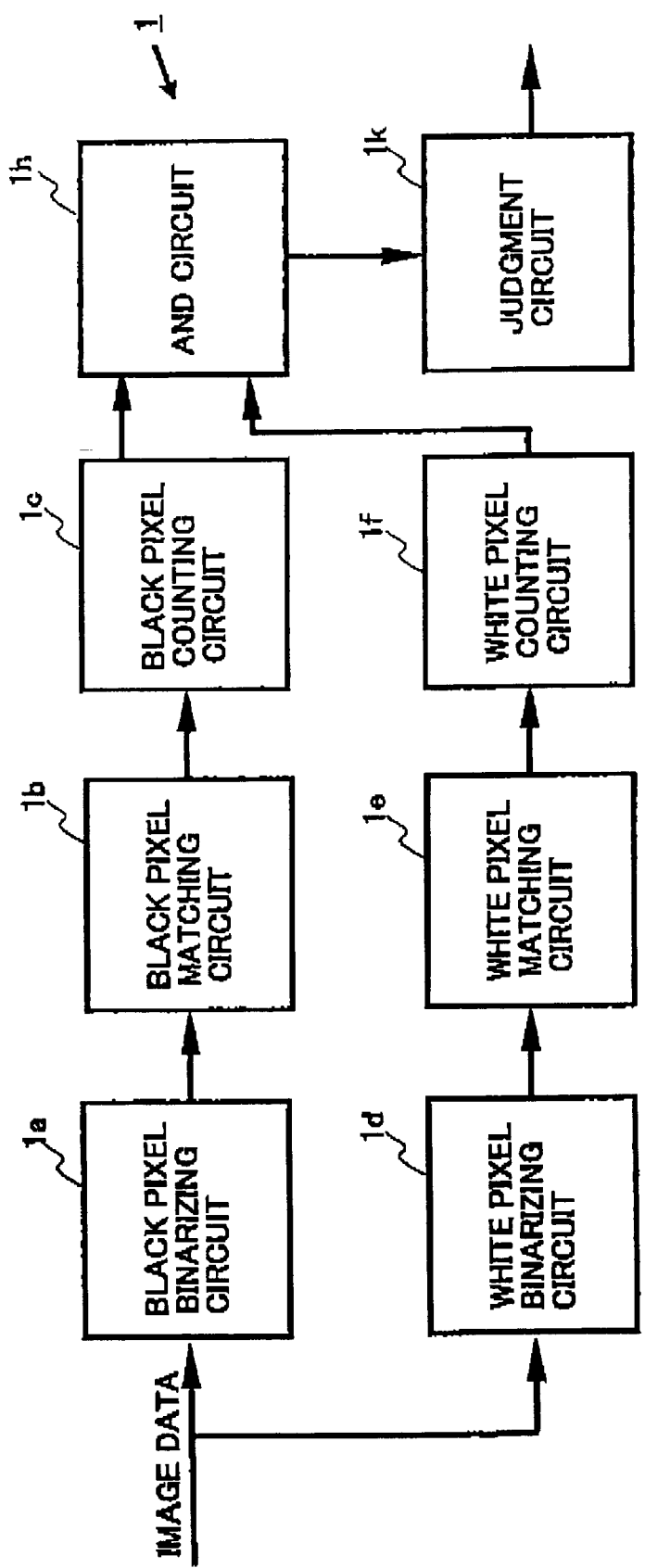
FIG. 5 is a detailed block diagram explaining a character candidate image processing apparatus according to the present invention.
Figure 6D:
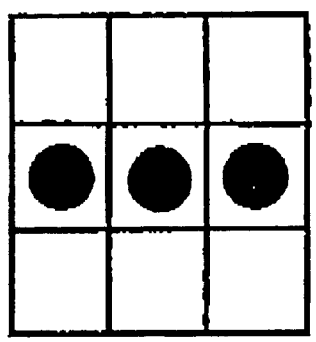
FIGS. 6A through 6H are pattern diagrams illustrating black pixel patterns employed for judgment in the digital image processing apparatus according to the present invention.
Figure 6C:
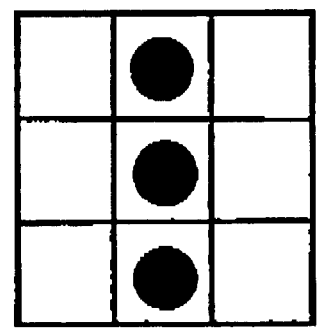
Figure 6B:
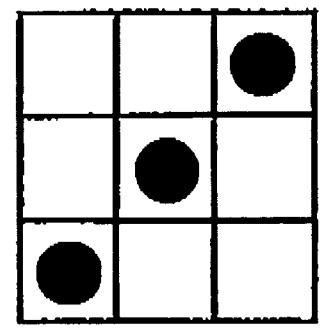
Figure 6A:
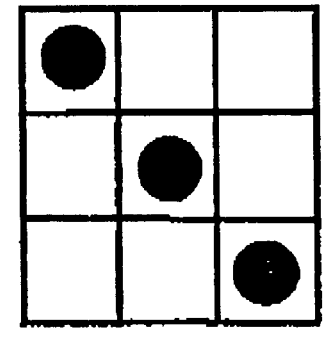
Figure 6H:
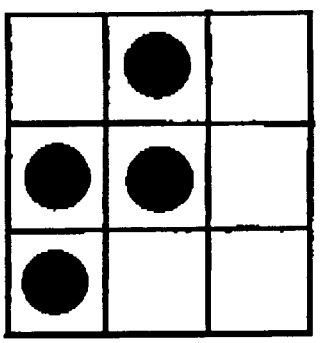
Figure 6G:
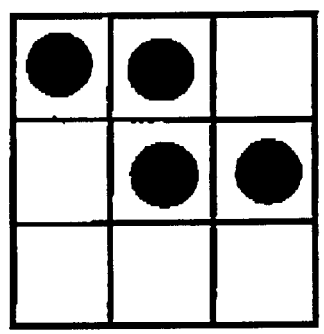
Figure 6F:
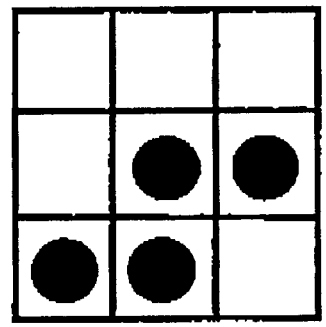
Figure 6E:
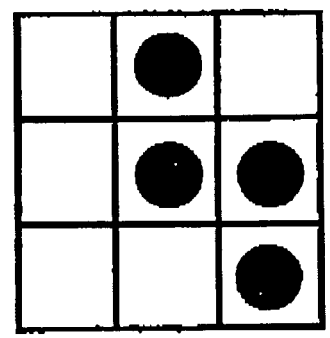
Figure 7D:
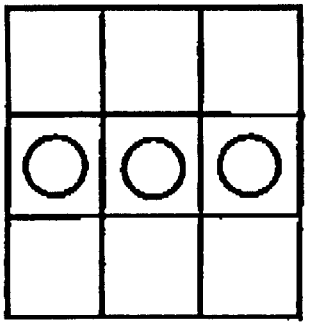
FIGS. 7A through 7H are pattern diagrams illustrating black pixel patterns employed for judgment in the digital image processing apparatus according to the present invention.
Figure 7C:
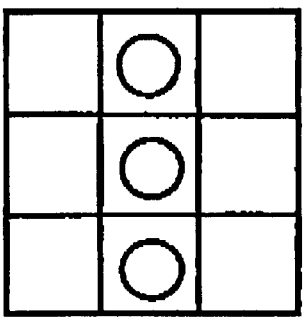
Figure 7B:
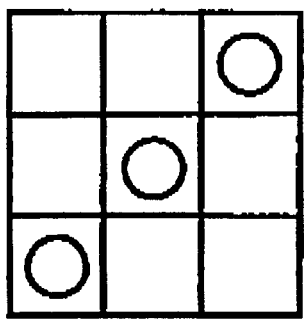
Figure 7A:
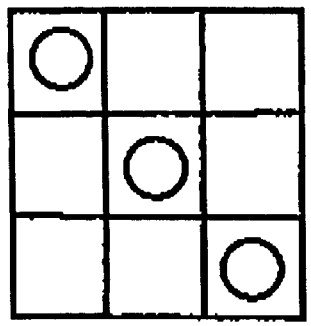
Figure 7H:
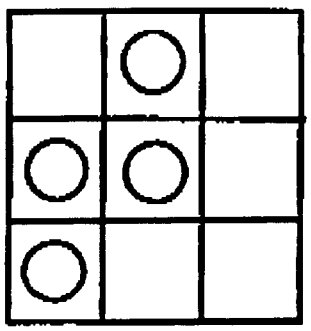
Figure 7G:
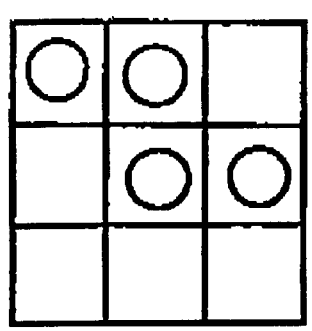
Figure 7F:
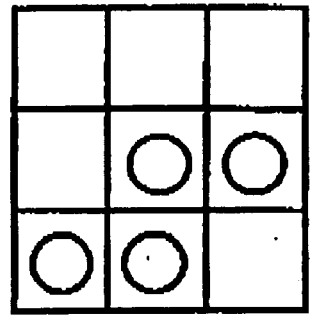
Figure 7E:
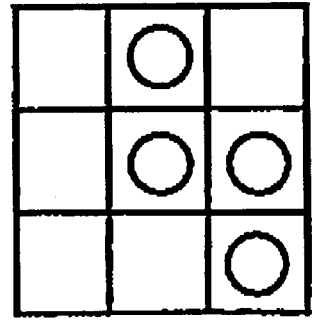

FIG. 5 is a detailed block diagram illustrating the character candidate area detecting circuit 1 shown in FIG. 2. In FIG. 5, the image signal is binarized to low level/not-low level, that is, black/non-black with a predetermined threshold value by use of a black pixel binarizing circuit 1a. Thereafter, the binarized signal is inputted to a black pixel pattern matching circuit 1b. When, for instance, the black/non-black in the 3×3 matrix of the pixels having a noticeable pixel located at the center thereof coincides with any one of the patterns shown in FIGS. 6A–6H, the black pixel pattern matching circuit 1b judges the noticeable pixel to be the character black pixel (connecting black pixel) and outputs the signal "1".

A black pixel counting circuit 1c counts the number of the outputs "1" of the black pixel pattern matching circuit 1b, that is, the number of the character black pixels, for instance, in the 3×3 matrix having the noticeable pixel in the center thereof. When the counting number becomes equal to or greater than a constant value (e.g., 2), the black pixel counting circuit 1c outputs the signal "1".

Furthermore, the image signal is binarized to the value of high level/not-high level, that is, the value of white/non-white with a predetermined threshold value by use of a white pixel binarizing circuit 1d. Thereafter, the white pixel binarizing circuit 1d inputs the binarized signal to a white pixel pattern matching circuit 1e. In the white pixel pattern matching circuit 1e, for instance, when the white/non-white office 3×3 matrix having the noticeable pixel in the center thereof coincides with any one of the patterns shown in FIGS. 7A–7H, the noticeable pixel is judged to be the character white pixel (connecting white pixel) and the signal "1" is outputted at that time. A white pixel counting circuit 1f counts the number of the outputs "1" of the white pixel pattern matching circuit 1e, that is, the number of the character white pixels, for instance, in the 3×3 matrix having the noticeable pixel in the center thereof. When the counting number becomes equal to or greater than a constant value (e.g., 2) the white pixel counting circuit 1f outputs the signal "1".

Furthermore, an AND circuit 1h outputs the logical product (AND) signal obtained by taking AND of the output signal value of the black pixel counting circuit 1c and that of the white pixel counting circuit if. Namely, for instance, two or more character black pixels and two or more character white pixels exist at the same time in the 3×3 matrix having the noticeable pixel located at the center thereof, an AND circuit Th outputs the signal "1". At this time, the noticeable pixel is assumed to be a temporary character pixel. When the number of temporary character pixels existing in the 5×5 matrix is equal to or greater than a predetermined number, a judgment circuit 1k judges the noticeable pixel or the block of a constant size (5×5 matrix) including the noticeable area and outputs the signal "1" at that time. Namely, utilizing the property in which the connecting white pixel and the connecting black pixel exist at the same time with considerably constant density on the contour portion of the character, the character candidate area is extracted therefrom.

Figure 8:
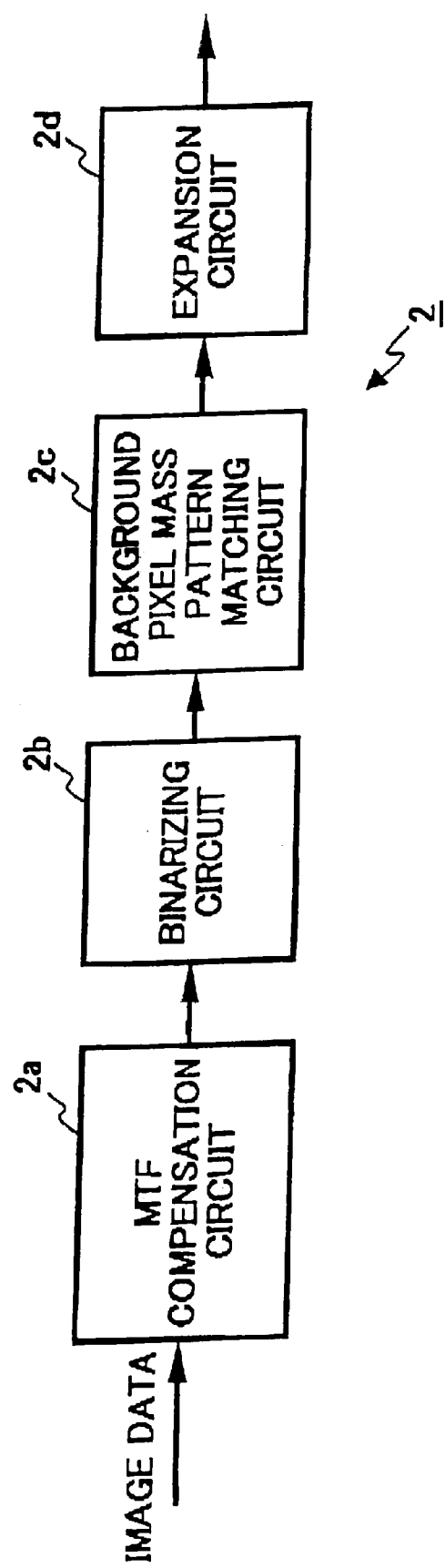
FIG. 8 is a detailed block diagram explaining a background area detecting circuit in the digital image processing apparatus according to the present invention.

FIG. 8 is a detailed block diagram illustrating a background area detecting circuit 2 in the digital image processing apparatus 19 according to the present invention. Here, the background area signifies the area in which the mass of the pixel (hereinafter, called the "background pixel") has a background density of a predetermined value (1×5, or 5×1) in the vicinity of the noticeable pixel. The detection of the background area is performed in the following method. Namely, after performing a process of sharpening the image data by use of an MTF compensation circuit 2a, the image data are distinguished with a predetermined threshold value by a binarizing circuit 2b. The image data thus distinguished are binarized to the background/non-background, and the binarized image data are inputted to a pattern matching circuit 2c.

FIGS. 9A and 9B illustrate the patterns of the background pixel mass in which all of 1×5, or 5×1 are the background pixels. In the background pixel mass pattern matching circuit 2c, the background pixel mass is detected using pattern matching. When the detected pattern coincides with the patterns shown in FIGS. 9A and 9B, the noticeable pixel is assumed to be an active pixel. An expansion circuit 2d counts the number of the active pixels, for instance, in the 5×5 block having the noticeable panels in the center thereof from the output of the background pixel mass pattern matching circuit 2c. If even one active pixel exists in the block, the expansion circuit 2d judges the entire block as the background area and outputs a judgment signal.

Figure 10:
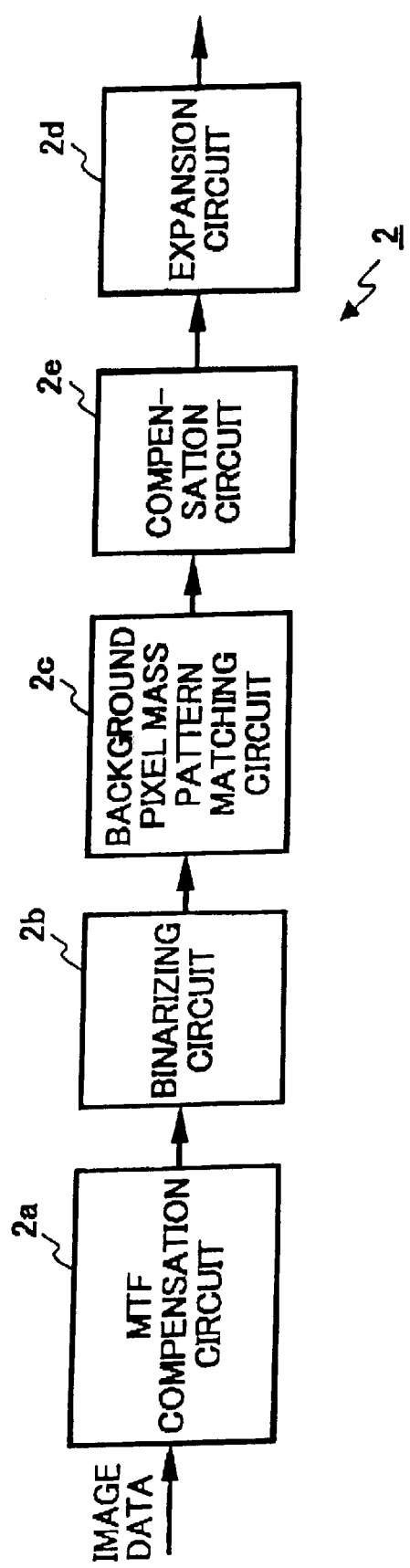
FIG. 10 is a detailed block diagram different from that shown in FIG. 8, explaining another background area detecting circuit in the digital image processing apparatus according to the present invention.
Figure 11:
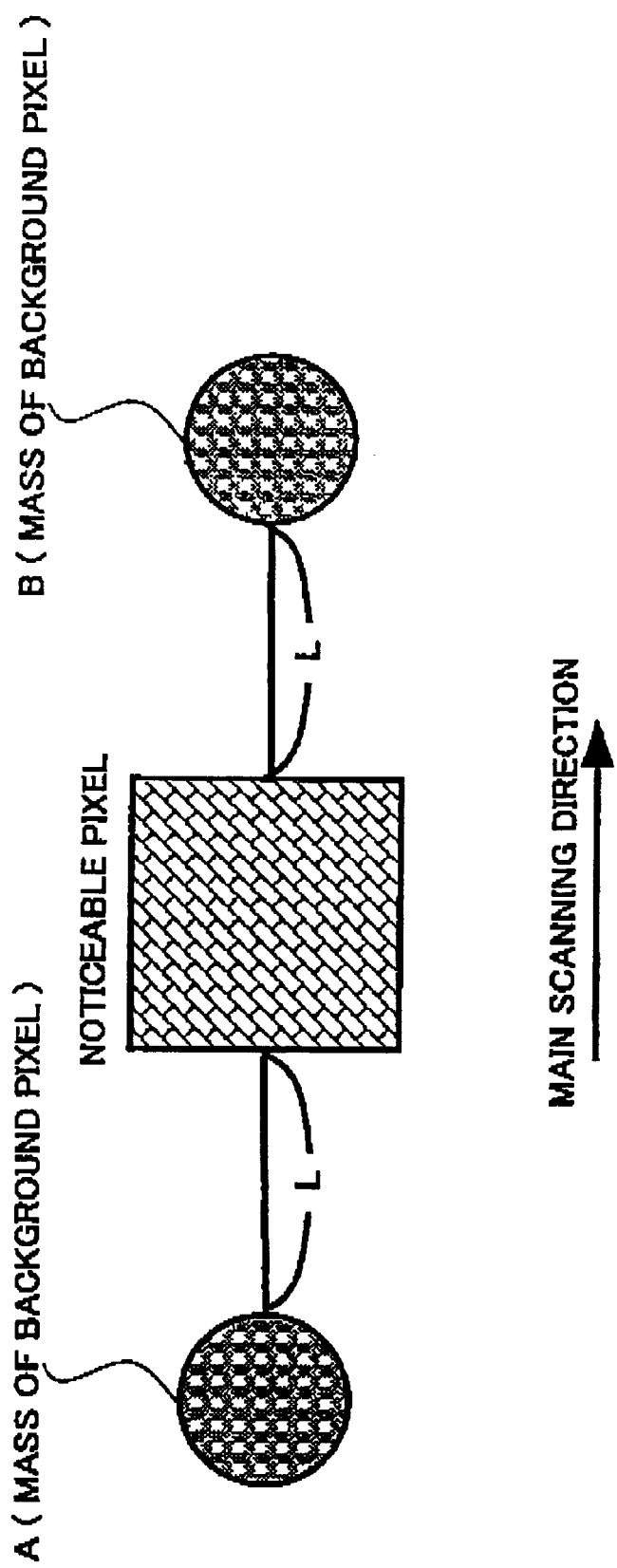
FIG. 11 is an explanatory diagram explaining a compensating process performed by the background area detecting circuit in the digital image processing apparatus according to the present invention when the mass of the background pixel exists in the vicinity of a target pixel.

FIG. 10 is a detailed block diagram different from the one in FIG. 8 illustrating another background area detecting circuit 2 in the digital image processing apparatus 19 according to the present invention. In FIG. 10, in order to improve the accuracy of detecting a character, a compensation circuit 2e is provided. Regarding the other circuits, since the structure thereof is same as that of FIG. 8, the explanation thereof is omitted.

In the embodiment shown in FIG. 10, after performing sharpening on the image data by use of the MTF compensation circuit 2a, the image data are distinguished with a predetermined threshold value by the binarizing circuit 2b and binarized to the background/non-background, and the binarized image data are inputted to the background pixel mass pattern matching circuit 2c. In the background pixel mass pattern matching circuit 2c, the background pixel mass in the vicinity of the noticeable pixel is detected by pattern matching. When the detected pattern coincides with the pattern shown in FIGS. 9A and 9B, the noticeable pixel is assumed to be an active pixel.

Next, after detecting the mass of the background pixel, when there exist the masses A and B of the background pixel on a place distant respectively to the right and left by L pixels from the noticeable pixel, the noticeable pixel is outputted as the real active pixel.

Figure 12:
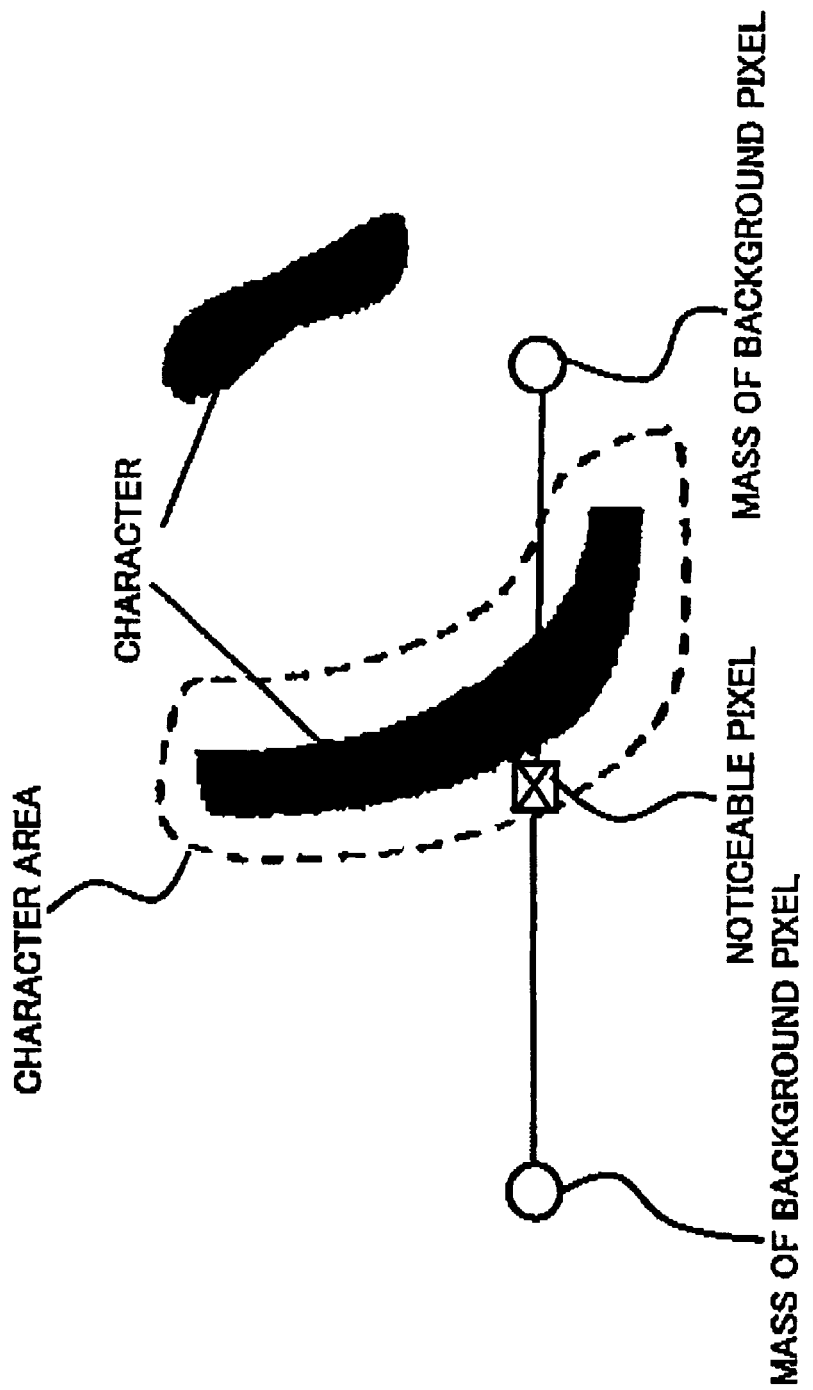
FIG. 12 is an explanatory diagram explaining another compensating process performed by the background area detecting circuit in the digital image processing apparatus according to the present invention when the mass of the background pixel exists in the vicinity of a target pixel.

As shown in FIG. 12, since such compensation process utilizes the property of enabling to detect, the background outside of the character can be necessarily detected in both directions of the noticeable pixel, the photograph and the net point can be further precisely detected as the non-character. The expansion circuit 2d counts the number of the active pixels, for instance, in the 5×5 block having the noticeable pixel on the center thereof. If even one active pixel exists in the block, the entire block is judged to be the background area and the judgment signal is outputted therefrom.

Consequently, going back to FIG. 2 from the operational explanation of the character candidate area detecting circuit 1 and the background area detecting circuit 2, when the noticeable pixel is judged to be the character candidate area by the character candidate area detecting circuit 1, and the same is judged to be the area in which the background (area) exists in the vicinity thereof by the background area detecting circuit 2, the area judging circuit 3 outputs the signal of judging the noticeable pixel or the block including the noticeable pixel to be the character area. In accordance with the judgment signal from the area judging circuit 3, the area process selecting section 6 selects either one of the character processing section 4 and the picture processing section 5.

SECOND EMBODIMENT

Figure 3:
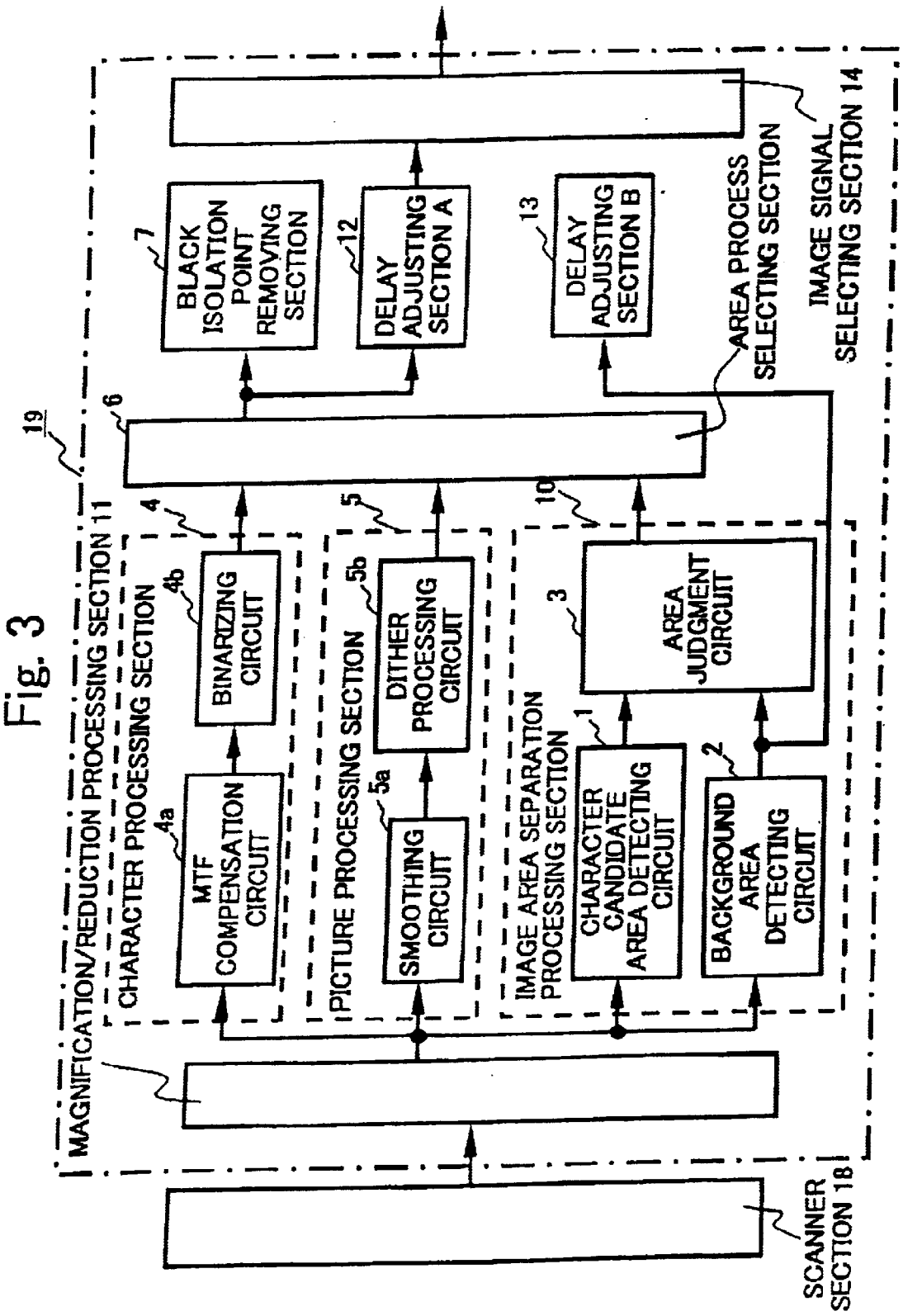
FIG. 3 is a block diagram explaining, by example, the main part of another digital image processing apparatus according to the present invention.

FIG. 3 is a block diagram illustrating the main part of the digital image processing apparatus relating to a second embodiment according to the present invention. The main difference between the digital image processing apparatus of the second embodiment and that of the first embodiment shown in FIG. 2 is that, in the former, a black isolation point removing section 7, a delay adjusting section A 12, another delay adjusting section B 13, and an image signal selecting section 14 are added to the apparatus of the first embodiment. The black isolation point removing section 7 operates such that the black isolation point is removed only in the image data existing in the background area detected by the background area detecting section 2 among the image data from the processing section selected by the area process selecting section 6.

Figure 13:
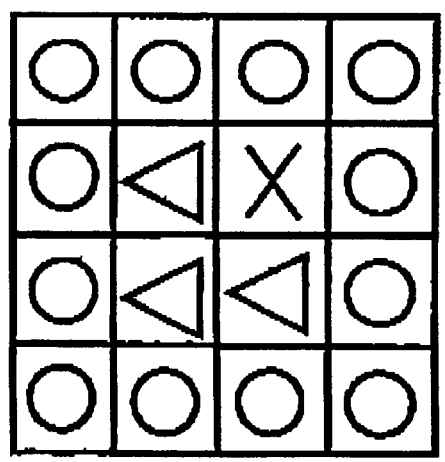
FIG. 13 is an explanatory diagram explaining the mask size of 4×4 in consideration of the removal of the black isolation point.

The state of removing the black isolation point by use of the black isolation point removing section 7 in the 4×4 mask size shown in FIG. 13 is described hereinafter. In FIG. 13, the pixel shown by the mark "O" is a white pixel, while the pixel shown by the mark "x" is a noticeable pixel, and the pixel show by the mark " " is either one of the white pixel and the black pixel. Assuming that the noticeable pixel is located at the position of the mark "x" among the binarized image data from the area process selecting section 6, when the white pixels are located at all of the positions marked with "O" in the circumference of the mask, the black isolation point removing section 7 replaces the noticeable pixel marked with "x" and the black pixel existing on the position marked with " " in the vicinity of the noticeable pixel to the white pixel, and the signal thus replaced is outputted therefrom. The black isolation point of the 4×4 mask size among the image data is removed, by performing the process as mentioned above.

Here, the delay adjusting circuit A 12 shown in FIG. 3 simply delays the image data from the area process selecting section 6 by the processing time of the black isolation point removing section 7, and the image data thus delayed are transmitted to the image signal selecting section 14. In the image signal selecting section 14, the image data from which the black isolation point is removed is selected in the background area, while the image data from which the black isolation point is not removed is selected in the non-background area. The delay adjusting circuit B 13 simply delays the signal from the background area detecting circuit 2 in the interior of the image area separation processing section 10, and the signal thus delayed is outputted therefrom. The delay time of the delay adjusting circuit 13 is the total of simply adding the processing times consumed in the area judgment circuit 3, the area process selecting section 6, and the black isolation point removing section 7. The signal of the delay time thus obtained is outputted therefrom.

Consequently, if the signal outputted from the delay adjusting section B 13 is the one signifying the background area, the image signal selecting section 14 selects the image data from which the black isolation point is removed. On the contrary, if the signal outputted from the delay adjusting section B 13 is the one signifying the non-background area, the image signal selecting section 14 selects the image data from which the isolation point is not removed.

THIRD EMBODIMENT

Figure 4:
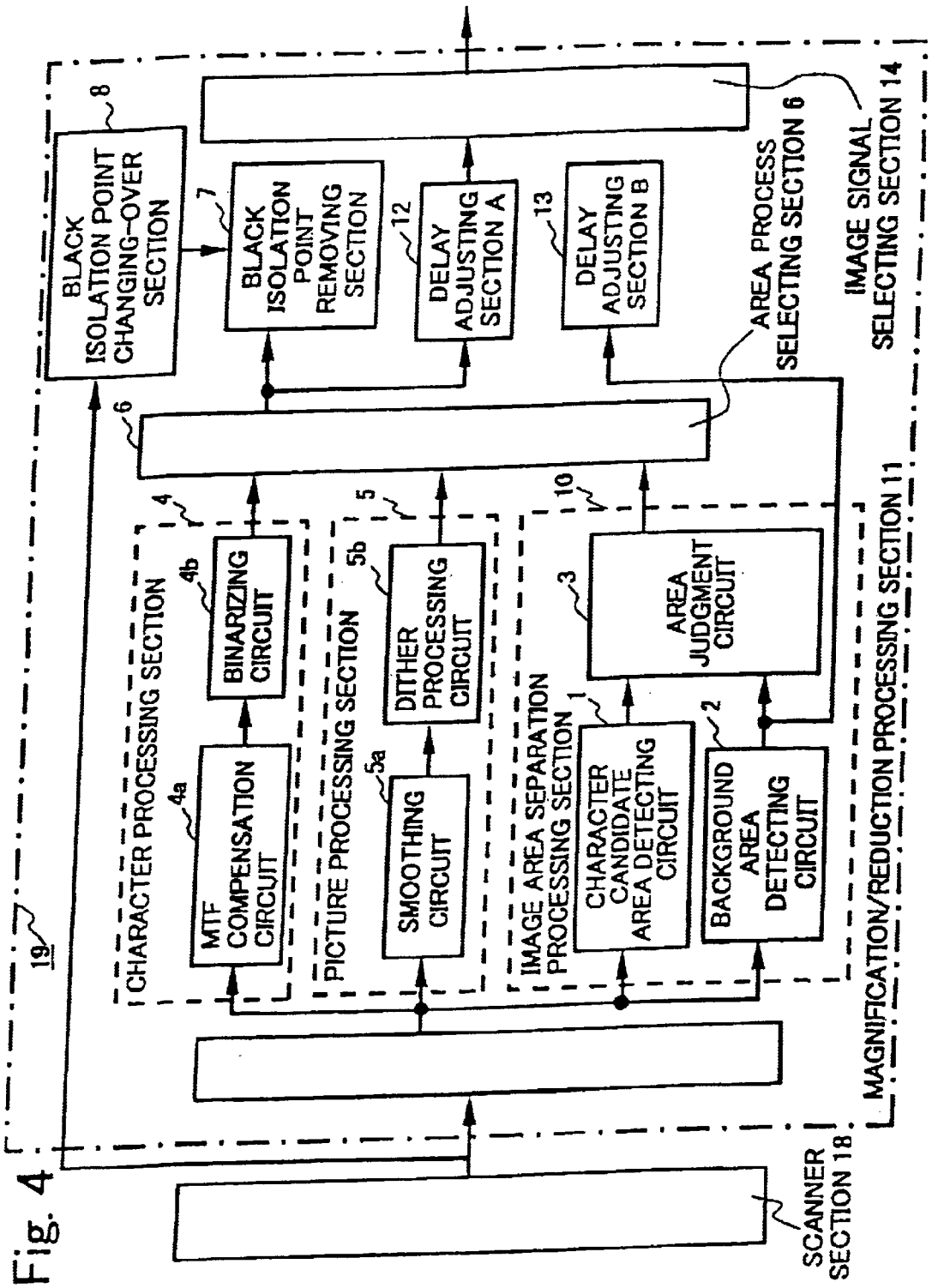
FIG. 4 is a block diagram explaining, by example, the main part of still another digital image processing apparatus according to the present invention.

FIG. 4 is a block diagram illustrating the main part of the digital image processing apparatus relating to the third embodiment according to the present invention. The main difference between the digital image processing apparatus of the third embodiment and that of the second embodiment shown in FIG. 3 is that, in the former, a black isolation point changing-over section 8 serving as a black isolation point changing-over mechanism is added to the apparatus of the second embodiment.

Since the other respective sections and circuits as same as those shown in FIG. 3, the explanation thereof is omitted and only the operation of the added black isolation point is described. The scanner section 18 serving as the document image reading-out apparatus in the embodiment performs the conversion of the independent reading-out densities for the main scanning and the subscanning of the basis of the fundamental density of 400 dpi as mentioned before.

In FIG. 3, it has been described that the black isolation point removing section 7 performs the judgment in the 4×4 mask size in the vicinity of the noticeable pixel. The square measure occupied by the one pixel area on the manuscript document varies in connection with the reading-out density.

Consequently, when the mask size used for removing the black isolation point is fixed, the processing result is changed in accordance with the change of the reading-out density. At this time, if the mask size is not suitable for the reading-out density, a stable result cannot be obtained for removing the black isolation point. For this reason, the black isolation point changing-over section 8 receives an instruction signal from the operational section not shown and the other instruction signal of the reading-out density from the scanner section 18, and practices a changing-over operation for making most suitable the mask size employed for removing the black isolation point at the black isolation point removing section 7.

Figure 14:
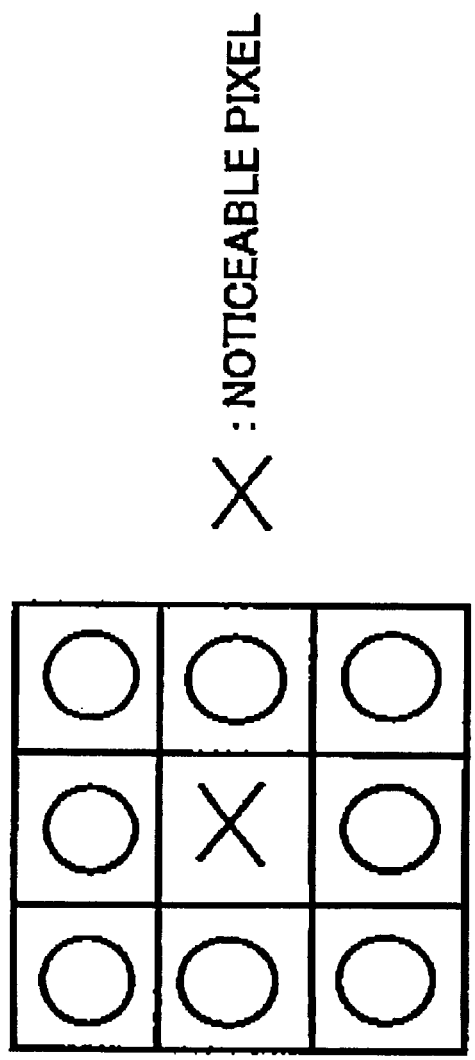
FIG. 14 is an explanatory diagram explaining the mask size of 3×3 in consideration of the removal of the black isolation point.
Figure 15:
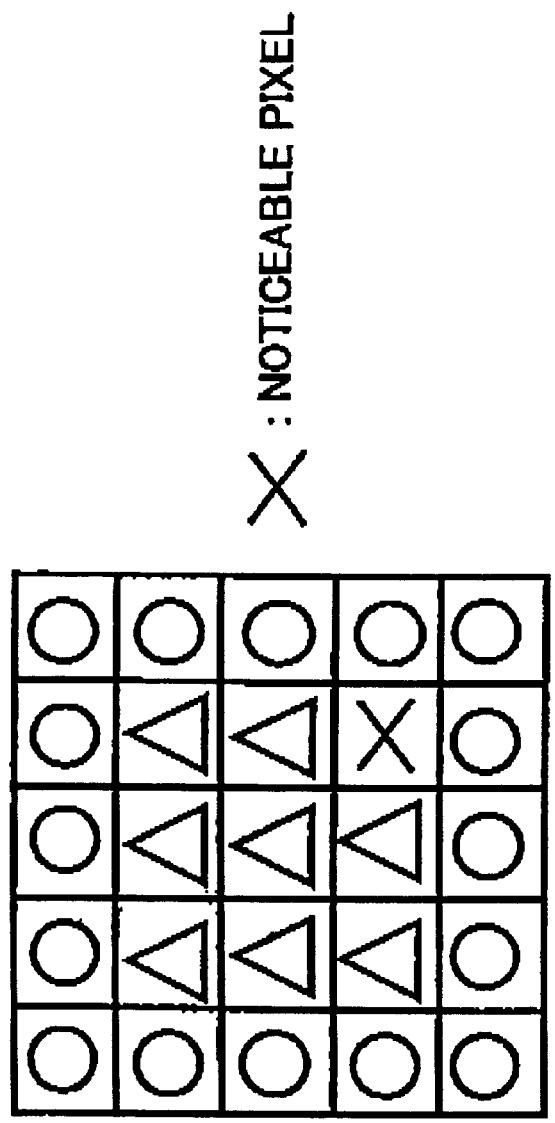
FIG. 15 is an explanatory diagram explaining the mask size of 5×5 in consideration of the removal of the black isolation point.

In the third embodiment of the invention, the mask size is changed over in accordance with the reading-out density. Namely, the 3×3 mask size shown in FIG. 14 is employed for the 200 dpi reading-out density, while the 5×5 mask size shown in FIG. 15 is employed for the 600 dpi. In FIG. 14, when all eight circumferential pixels surrounding the mark "x" of the noticeable pixel are white pixels as shown in FIG. 14, the mark "x" of the noticeable pixel is outputted therefrom as a white pixel. By performing such a process, the black isolation point of the 3×3 mask size in the image data can be removed. Furthermore, in FIG. 15, when the noticeable pixel is located at the position marked with "x" and all of the sixteen circumferential pixels of the mask size are white pixels as shown in FIG. 15, the noticeable pixel marked with "x" and the black pixels existing at the positions marked with "Δ" in the vicinity of the noticeable pixel are replaced with white pixels and the replaced pixels thus replaced are outputted from the black isolation point removing section 7.

By performing such a process, the black isolation point of the 5×5 mask size in the image data is removed. Owing to such changing-over operation, the unnecessary black isolation point can be removed regardless of the reading-out density.

Figure 16:
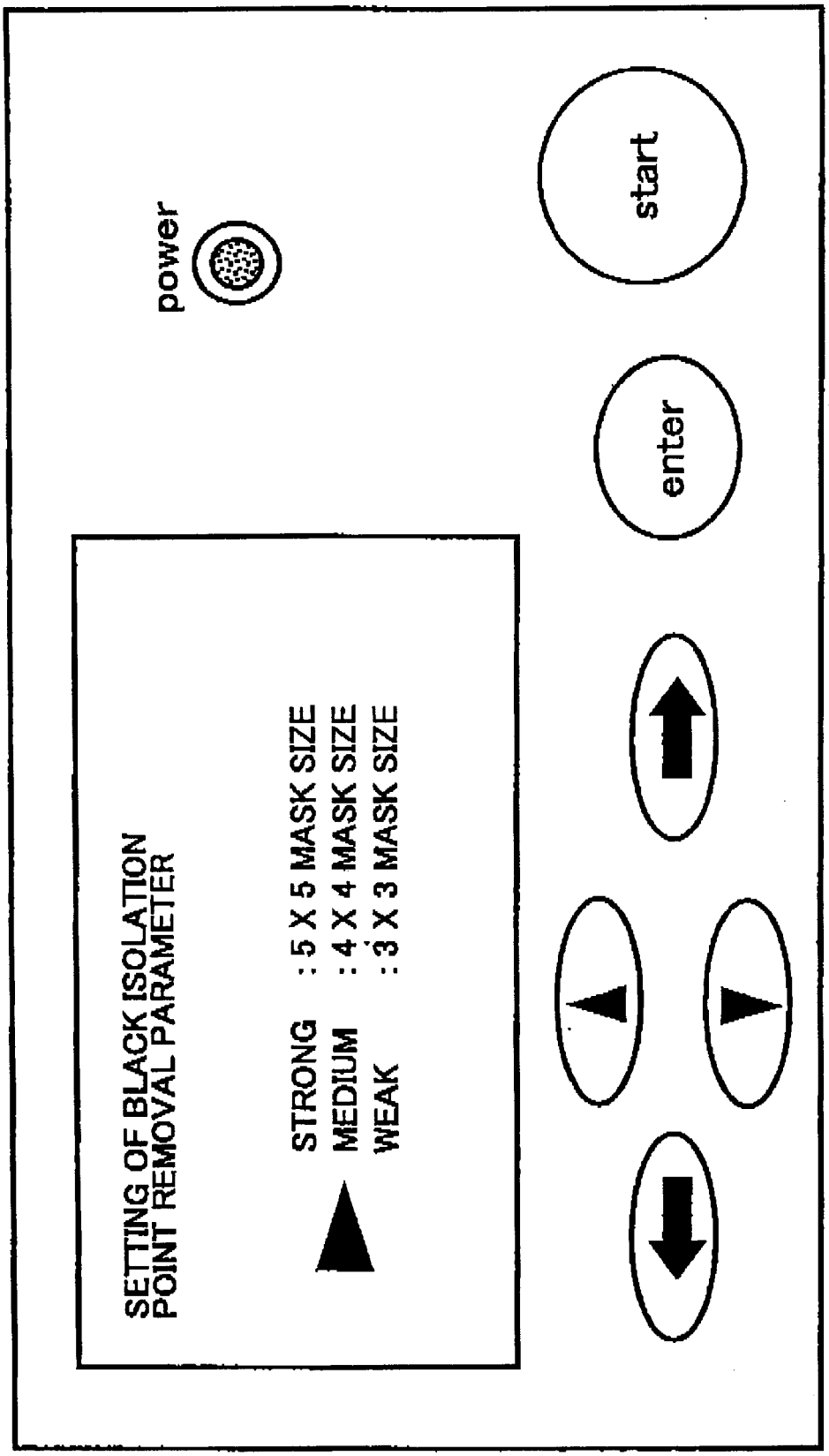
FIG. 16 is an explanatory diagram explaining an example of the operating section for setting the mask size from the external part in consideration of the removal of the black isolation point.

Furthermore, an example of the operation displaying section (not shown in FIGS. 2–4) disposed in the scanner section 18 or in the digital image processing apparatus 19 is shown in FIG. 16. In the embodiment, the user or the service man judges the contents of the image on the manuscript document to be read out and enables to change over the size of the mask size to be considered for removing the black isolation point. Namely, the suitable mask size to be made is selected by an operation key located at a lower portion of the display shown in FIG. 16, and the size thereof can be set by pushing the "enter" key. Owing to such setting, the black isolation point changing-over portion 8 shown in FIG. 4 can operate the black isolation point removing section 7 such that the black isolation point is removed with the mask size which has been set as mentioned above.

As is apparent from the foregoing description, according to the present invent invention, in the first embodiment, a digital image processing apparatus capable of performing image area separation of a manuscript having the background density not only on the white background area but on the other all colors background area with high accuracy by way of the improved method of the background art can be provided.

In the second embodiment, in addition to the merits of the first embodiment, the particle-state isolation point occurring at the time of performing the process with the priority for the halftone in the background area can be removed, and thereby the quality of reproducing the manuscript document can be remarkably improved. Consequently, it is possible to provide a digital image processing apparatus which can be used for a manuscript such as for electronic filing, etc. and articles of a newspaper, a magazine, a catalog, and so on.

In the third embodiment, in addition to the merits of the second embodiment, since the size of the black isolation point removed by the black isolation point removing mechanism can be changed over, it is possible to provide a digital image processing apparatus in which the black isolation point of the manuscript document having the background density is effectively removed and thereby the quality of reproducing the manuscript document is considerably improved. Furthermore, since the size of the black isolation point to be removed is changed over, in accordance with the density of the image data from the document image, it is also possible to provide a digital image processing apparatus in which the black isolation point does not lie scattered regardless of the reading-out density of the input image and the quality of reproducing the manuscript document is improved.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Furthermore, while the preferred embodiment of the present invention has been described heretofore, numerous additional modifications and variations of the present invention are possible in light of the above teachings. It is therefore to be understood that within the scope of the appended claims, the present invention may be practiced otherwise than as specifically described herein.

What is claimed is:

1. A digital image processing apparatus having a function of separating an image data from an original manuscript document into a character area and a picture area, comprising:

a character candidate area detecting mechanism configured to detect a character candidate area from the image data;

a background area detecting mechanism including,
      a binarizing circuit configured to binarize the image data using a predetermined threshold value to produce binarized image data associated with a halftone image, and
      a pattern matching circuit configured to determine whether the binarized image data matches one of a plurality of patterns,
      wherein the background area detecting mechanism is configured to detect
   whether a background area exists around a detected character candidate area based on an output of said pattern matching circuit;

an area judging mechanism configured to judge that an area satisfying at the same time detected conditions of (i) being a character candidate area and (ii) having a background area is said character area and an area outside said character area is said picture area;

a character processing mechanism configured to process the image data in the character area;

a picture processing mechanism configured to process the image data in said picture area; and an area-processing selecting mechanism configured to select either one of said character processing mechanism and said picture processing mechanism on the basis of a judgment result of said area judging mechanism.

2. The digital image processing apparatus as defined in claim 1, further comprising:

a black isolation point removing mechanism removing a black isolation point only in image data existing in the background area detected by said background area detecting mechanism among the image data from the processing mechanism selected by said area-processing selecting mechanism.

3. The digital image processing apparatus as defined in claim 2, further comprising:

a black isolation point changing-over mechanism configured to change over the size of said black isolation point removed by said black isolation point removing mechanism.

4. The digital image processing apparatus an defined in claim 3, wherein said black isolation point changing-over mechanism changes over the size of said black isolation point removed in accordance with the density of the image data from the original manuscript document.

5. A digital image processing apparatus having a function of separating image data from an original manuscript document into a character area and a picture area, comprising:

character candidate area detecting means for detecting a character candidate area from the image data;

background area detecting means including,
      means for binarizing the image data using a predetermined threshold value to produce binarized image data associated with a halftone image, and
      means for detecting whether the binarized image data matches one of a plurality of patterns,
      wherein the background area detecting means detects whether a background area exists around a detected character candidate area based on an output of said means for detecting;

area judging means for judging that an area satisfying at the same time detected conditions of (i) being a character candidate area and (ii) having a background area is said character area and an area outside said character area is said picture area;

character processing means for processing the image data in the character area;

picture processing deans for processing the image data in the picture area; and area processing selecting means for selecting either one of said character processing means and said picture processing means on the basis of a judgment result of said area judging means.

6. The digital image processing apparatus as defined in claim 5, further comprising:

black isolation point removing means for removing said black isolation point only in the image data existing in the background area detected by said background area detecting means among the image data from the processing means selected by said area-processing selecting means.

7. The digital image processing apparatus as defined in claim 6, further comprising:

black isolation point changing-over means for changing over a size of said black isolation point removed by said black isolation point removing means.

8. The digital image processing apparatus as defined in claim 7, wherein said black isolation point changing-over means changes over the size of said black isolation point removed in accordance with the density of the image data from the original manuscript document.

9. A digital image processing apparatus having a function of separating an image data from an original manuscript document into a character area and a picture area, comprising:

a character candidate area detecting mechanism configured to detect a character candidate area from the image data;

a background area detecting mechanism including,
 a binarizing circuit configured to binarize the image data using a predetermined threshold value to produce binarized image data associated with a halftone image, and
 a pattern matching circuit configured to determine whether the binarized image data matches one of a plurality of patterns, wherein the background area detecting mechanism is configured to detect whether a background area exists around a detected character candidate area based on an output of said pattern matching circuit;

an area judging mechanism configured to judge that an area satisfying at the same time detected conditions of (i) being a character candidate area extracted with densities, greater than respective predetermined values, of consecutive white pixels and consecutive black pixels existing in the character candidate area; and (ii) having a background area containing a cluster of pixels having a background density, greater than a predetermined value, in a vicinity of a focused pixel, is said character area and an area outside said character area is said picture area;

a character processing mechanism configured to process the image data in the character area;

a picture processing mechanism configured to process the image data in said picture area; and an area-processing selecting mechanism configured to select either one of said character processing mechanism and said picture processing mechanism on the basis of a judgment result of said area judging mechanism.

* * * * *